(12) United States Patent
Chanclon Fernandez et al.

(10) Patent No.: US 12,064,921 B2
(45) Date of Patent: Aug. 20, 2024

(54) FORMING A SEALED FLUID FLOW PATH

(71) Applicant: HEWLETT-PACKARD DEVELOPMENT COMPANY, L.P., Spring, TX (US)

(72) Inventors: David Chanclon Fernandez, Sant Cugat del Valles (ES); Pablo Antonio Murciego Rodriguez, Sant Cugat del Valles (ES); Jorge Diosdado Borrego, Sant Cugat del Valles (ES)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 161 days.

(21) Appl. No.: 17/616,090

(22) PCT Filed: Oct. 15, 2019

(86) PCT No.: PCT/US2019/056215
§ 371 (c)(1),
(2) Date: Dec. 2, 2021

(87) PCT Pub. No.: WO2021/076101
PCT Pub. Date: Apr. 22, 2021

(65) Prior Publication Data
US 2022/0297378 A1 Sep. 22, 2022

(51) Int. Cl.
*B29C 64/35* (2017.01)
*B29C 64/255* (2017.01)
*B33Y 30/00* (2015.01)
*B33Y 40/00* (2020.01)

(52) U.S. Cl.
CPC ............ *B29C 64/35* (2017.08); *B29C 64/255* (2017.08); *B33Y 30/00* (2014.12); *B33Y 40/00* (2014.12)

(58) Field of Classification Search
CPC .............................. B29C 64/35; B29C 64/255
See application file for complete search history.

(56) References Cited

U.S. PATENT DOCUMENTS 6,050,446 A * 4/2000 Lei .................... H01L 21/67017
220/264
2005/0280185 A1 12/2005 Russell et al.
2016/0193696 A1* 7/2016 McFarland ............. B22F 10/28
219/76.12

(Continued)

FOREIGN PATENT DOCUMENTS

CN 106901391 A 6/2017
CN 108407292 A 8/2018

(Continued)

OTHER PUBLICATIONS

Pilzweger (CN108527853A) machine translation accessed on ESpaceNet Jul. 6, 2023 (Year: 2018).*

*Primary Examiner* — Alison L Hindenlang
*Assistant Examiner* — Erica Hartsell Funk
(74) *Attorney, Agent, or Firm* — Shook, Hardy & Bacon L.L.P.

(57) ABSTRACT

Disclosed is a sealing member for a build unit of a 3D printing system, the build unit comprising a surface which is exposed to residual build material in use. The sealing member is adapted to engage with the build unit and form therewith a sealed fluid flow path comprising an inner surface including said surface, a fluid inlet and a fluid outlet.

15 Claims, 8 Drawing Sheets

(56) References Cited

U.S. PATENT DOCUMENTS

| | | | |
|---|---|---|---|
| 2016/0325507 A1 | 11/2016 | Chu et al. | |
| 2017/0120522 A1* | 5/2017 | Skubic | B29C 64/118 |
| 2018/0001567 A1* | 1/2018 | Juan | B29C 64/259 |
| 2018/0126462 A1 | 5/2018 | Murphree et al. | |
| 2019/0143598 A1 | 5/2019 | Hakkaku | |

FOREIGN PATENT DOCUMENTS

| | | |
|---|---|---|
| CN | 108527853 A | 9/2018 |
| EP | 3154730 B1 | 8/2018 |
| JP | 2018199339 A | 12/2018 |

\* cited by examiner

FORMING A SEALED FLUID FLOW PATH

CROSS-REFERENCE TO RELATED APPLICATIONS

This application is a U.S. National Stage Application of PCT Application No. PCT/US2019/056215, filed Oct. 15, 2019, entitled "FORMING A SEALED FLUID FLOW PATH," which is incorporated herein by reference.

BACKGROUND

Additive manufacturing systems, including those commonly referred to as "3D printers", provide a convenient way to produce three-dimensional objects. These systems may receive a definition of a three-dimensional object in the form of an object model. This object model is processed to instruct the system to produce the object using one or more material components. This may be performed on a layer-by-layer basis in a working area of the system. Generating objects in three-dimensions presents many challenges that are not present with two-dimensional print apparatus.

BRIEF DESCRIPTION OF THE DRAWINGS

Various features of the present disclosure will be apparent from the detailed description which follows, taken in conjunction with the accompanying drawings, which together illustrate features of the present disclosure, and wherein.

DETAILED DESCRIPTION

In the following description, for purposes of explanation, numerous specific details of certain examples are set forth. Reference in the specification to "an example" or similar language means that a particular feature, structure, or characteristic described in connection with the example is included in at least that one example, but not necessarily in other examples.

In the production of three-dimensional objects, e.g. in so-called "3D-printing", there is a challenge to produce objects with measurements that have a higher overall part quality, e.g. smaller variation in densities, internal stresses or mechanical properties. In order to meet part quality objectives, all stages of the process should be consistent. 3D printing systems may produce 3D objects by solidifying successive layers of a build material. The build material may be in the form of a powder comprising, for example, plastic, metal, or ceramic particles.

Figure 1:
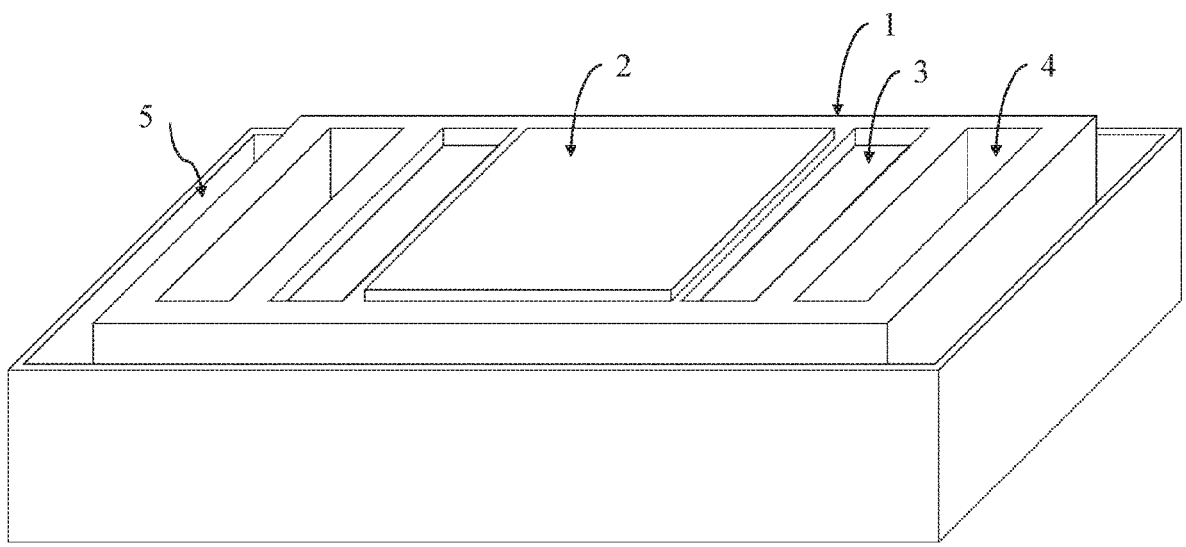
FIG. 1 is an isometric schematic view of a 3D printer build unit according to an example.

FIG. 1 shows an example of a build unit 1. A build unit in general terms is a part of a layer-by-layer 3D printing system on which a build operation is performed. The built unit may be an integral part of a 3D printer or it may be a removable part, which can be removed when build material has become depleted, refilled with build material and returned to the 3D printer thereafter for further build operations. The build unit 1 according to the example in FIG. 1 comprises a build platform 2, a feed platform 3, an overflow 4 and a peripheral channel 5. As shown in FIG. 1, the build unit may comprise more than one feed platform 3 or overflow 4. A build platform 2 comprises a platen on which a build operation is performed. The platen lowers by a small amount after each layer of a build operation is generated. A feed platform 3 typically holds build material and raises during a build operation to supply build material to be spread onto the platen. Once the feed platform has been emptied residual build material may remain on the surface of the feed platform. An overflow 4 captures any excess build material that is spread beyond the platen. The peripheral channel 5 collects build material that may otherwise spill over the edge of the build unit during a build operation. Build material in the overflow 4 or peripheral channel after a build operation can be thought of as residual build material.

In general, in use, a surface of the build unit 1 is exposed to build material during a build operation and, after the build operation has completed, residual build material may remain on the surface(s). According to examples herein, the build platform 2, the feed platform 3, the overflow 4 and the peripheral channel 5 each comprise one or more surfaces on which residual build material may reside after a build operation. Similar surfaces may exist in other kinds of 3D printing system, irrespective of whether or not they employ a build unit, or even in other kinds of printing system (e.g. a system in which a print or other kind of reproduction operation uses printing material such as a toner or another dry, particulate material such as a plastics powder, which can be applied to a print medium and fused).

As illustrated herein, a surface, or surfaces, may be flat, formed, shaped or profiled. A surface or surfaces may form a generally concave region or cross section of region, for examples with side surfaces and a bottom surface, such as the feed platform 3, the overflow 4 and the peripheral channel 5. Such regions may be thought of generally as channels, and may be referred to a ducts, recesses or troughs. Although not shown, examples herein also apply to other shapes or forms of surface, which may not be generally concave in form or cross section. Surfaces may, for example, include flat or form generally convex or complex surfaces, and may also include surfaces with upstanding facets or elements thereon. Examples herein can be applied to any surface on which residual build material may reside after a build operation.

In use, during a build operation, build material is distributed a layer at a time on the build platform 2. The layer is processed and parts thereof are solidified according to the object being built. Once the operation has finished, residual build material may remain on various surfaces, for example on or around the build platform 2, the feed platform 3, the overflow 4 and/or the peripheral channel 5. As has been described, residual build material may remain on other surfaces, for example, depending on the design of the 3D printer and/or the build unit. To ensure the consistency and part quality of each build, the build unit 1 should be cleaned thoroughly, including by removing residual build material from surfaces between build operations.

Cleaning methods may include manually "scooping" or brushing the build material out of the build unit. However, manual methods may be time consuming.

Figure 2:
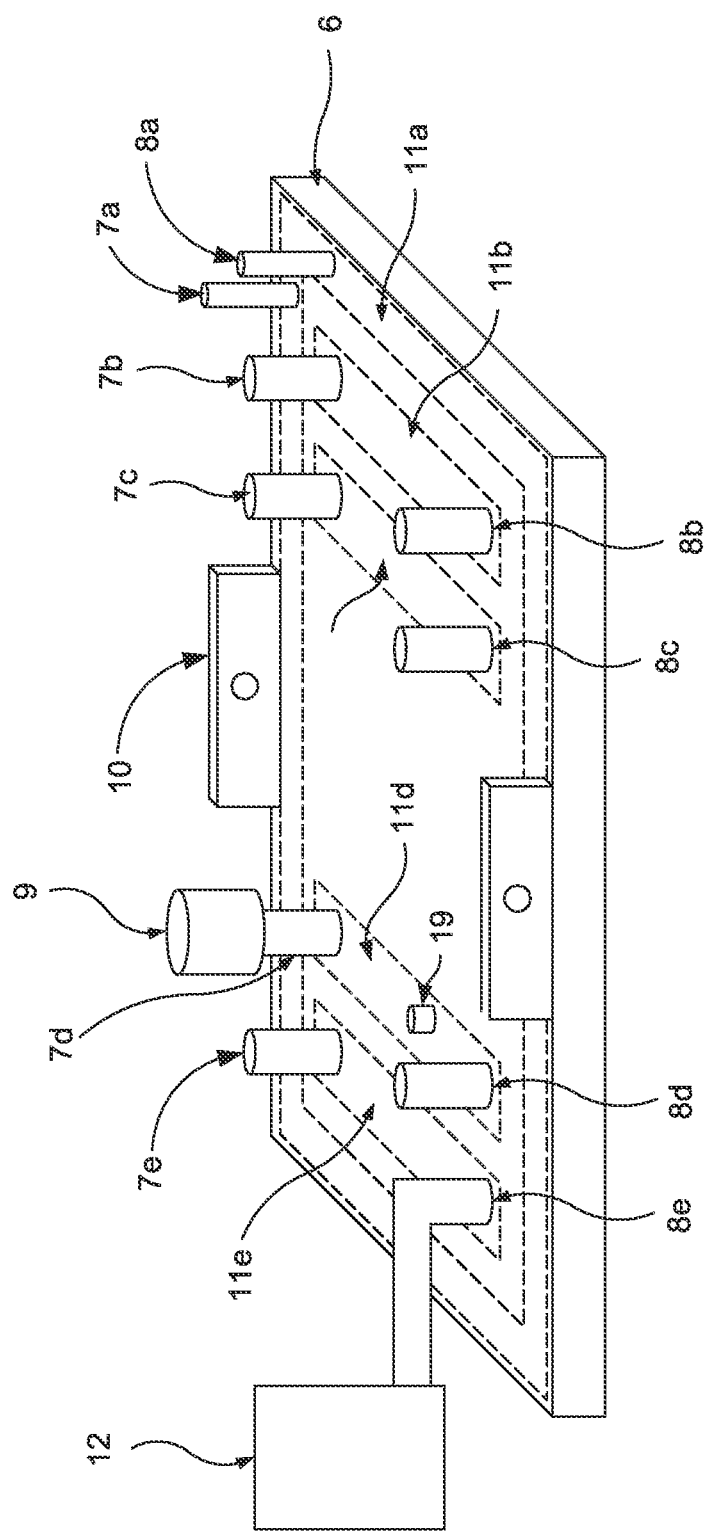
FIG. 2 is an isometric schematic view of an apparatus according to an example.

FIG. 2 shows an example of an apparatus, which is arranged to co-operate with a build unit 1. The apparatus comprises a sealing member 6. The sealing member 6 is adapted to engage with the build unit 1 (such as that shown in FIG. 1) and form therewith one or more sealed fluid flow paths, illustrated in various locations as 11a, 11b, 11c, 11d, 11e (collectively referred to as "11"). The sealed fluid flow paths 11 comprise an inner surface including one or more surfaces on which residual build material may remain, a fluid inlet 7 and a fluid outlet 8. Multiple fluid inlets 7 and fluid outlets 8 are shown in FIG. 2, each being associated with one of the various sealed fluid flow paths 11. The position and number of the fluid inlets 7 and fluid outlets 8 is illustrative of one example. In other examples, a different number of sealed fluid flow paths may be generated, with respective fluid inlets 7 and fluid outlets 8, and they may be positioned in a different configuration to that shown in FIG. 2.

In the present examples, the fluid is air. In other examples, for instance if a build material is sensitive to or reactive with any water content in air, it is conceived that the fluid could be other gases or even liquids, for example, depending on the nature of the build material and the cleaning operation.

The apparatus of FIG. 2 further comprises a flow generator 12. The flow generator 12 is to generate a fluid flow in the sealed fluid flow path 11 from the fluid inlet 7 to the fluid outlet 8. The fluid flow is generated to carry the residual build material out of the sealed fluid flow path 11 via the fluid outlet 8. The fluid flow may be a laminar flow, which carries the build material. This provides improved cleaning performance. Moreover, the cleaning may be carried out without manual intervention from the operator.

In one example, the flow generator 12 generates a vacuum at the fluid outlet 8 to generate a fluid flow from the fluid inlet 7. In another example, the flow generator 12 pumps fluid into the sealed fluid flow path 11 through the fluid inlet 7 to generate a flow out of the fluid outlet 8. In either case, residual build material that exits the fluid outlet 8 may be collected, recycled and re-used in future build operations.

In one example, the apparatus comprises a support structure (part of which is shown as 10 in FIG. 2) pivotally connected to the sealing member 6. The support structure supports pivotal movement of the sealing member 6 between an open position, in which the build unit is introduced into the support structure in alignment with the sealing member 6, and a closed position, in which the sealing member 6 engages with the build unit 1 to form the sealed fluid flow path 11. In that case, the sealing member may operate as a lid that can be closed onto the build unit when the build unit is introduced into the support structure. The support structure may be part of a recycling station, which is used for refilling the build unit 1 with build material and/or removing and recycling build material from the build unit 1, for example, as part of a cleaning operation applying examples herein. Conveniently, then, residual build material that is removed by operation of the sealing member 6 can be recycled by the recycling station.

The sealing member 6 may alternatively form part of the build unit 1 itself, and can be deployed during a cleaning cycle of the build unit. In another example, the sealing member 6 is a separate, discrete component to the build unit 1, which can be attached to the build unit during cleaning.

A removable build unit 1 may be provided with wheels to allow it to be moved between various locations. For example, the build unit may be moved from a first location where printing takes place, such as a 3D printer, to a second location in the support structure, such as at a recycling station, where cleaning can take place.

Returning to FIG. 1, inner surfaces (e.g. walls and base) of the peripheral channel 5 collect residual build material. The sealing member 6 is adapted to engage with, for example overlie and seal, the peripheral channel 5 and form therewith a sealed fluid flow path 11a, around the periphery of the build unit. The sealed fluid flow path 11a extends between the fluid inlet 7a and the fluid outlet 8a.

As shown in FIG. 2, the fluid inlet 7 comprises a filter 9 to ensure contamination, such as particulates, does not enter with the fluid into the fluid inlet 7 and thereby contaminate otherwise recyclable build material. When the fluid is air the filter 9 is an air filter. The fluid outlet 8 may comprise a filter or other mechanism to collect removed build material from a respective fluid flow.

As shown in FIG. 2, the fluid inlet 7 and the fluid outlet 8 are disposed at opposite ends of the sealed fluid flow path 11. This is so that fluid flow is along the length of a sealed fluid flow path 11, to remove as much build material as possible between the fluid inlet 7 and the fluid outlet 8. In one example, multiple fluid inlets 7 or fluid outlets 8 may be provided for each sealed fluid flow path 11.

Figure 3:
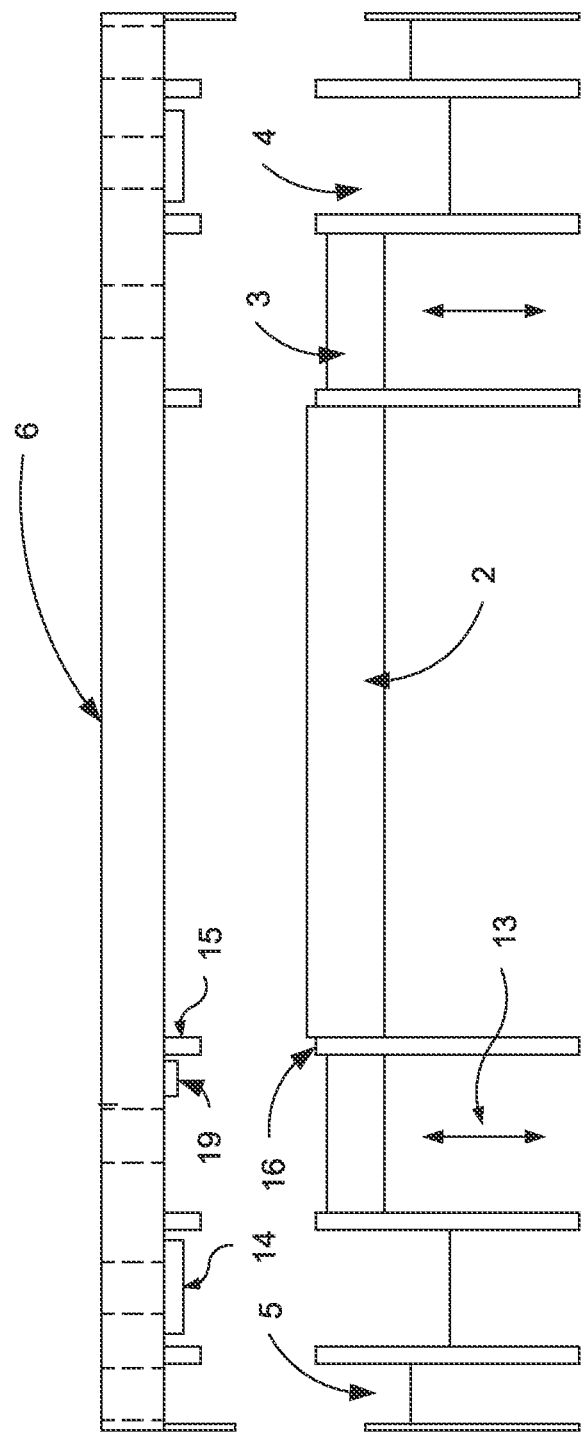
FIG. 3 is a cross-sectional schematic view of an apparatus according to an example.

FIG. 3 shows a cross-sectional view of the build unit of FIG. 1 together with a cross-sectional view of the sealing member 6 of FIG. 2. As shown in FIG. 3, in use, the feed platforms 3 may move in the direction shown by arrows 13. When the sealing member 6 is engaged with the build unit 1, the feed platforms 3 may be controlled to move towards the sealing member 6 to allow for easier and more efficient cleaning by decreasing the volume of the sealed fluid flow path 11 during the cleaning operation.

As shown in FIG. 3, the sealing member 6 comprises sealing members or surfaces 15 which are arranged to engage with corresponding sealing members or surfaces 16 on the build unit to form the sealed fluid flow paths 11.

In one example, the rate at which the feed platform 3 is raised along arrow 13 may be controlled to achieve a predetermined rate of build material extraction is use.

In one example, as shown in FIG. 3, the sealed fluid flow path 11 may comprise at least one protrusion 14 extending into the path, which is adapted to create turbulence in a fluid flow generated between the fluid inlet 7 and the fluid outlet 8. In one example, the at least one protrusion 14 comprises a plurality of fins. The turbulence caused by the protrusion 14 is arranged to disrupt an otherwise laminar flow along the sealed fluid flow path and so dislodge build material that may otherwise not be disturbed and/or removed by the flow.

As shown in FIG. 3, the sealing member 6 may comprise sealing members or surfaces 15 which are arranged to engage with corresponding sealing members or surfaces 16 on the build unit to form the sealed fluid flow paths 11.

The sealing member 6 may comprise a sensor 19 to detect the level of the feed platform 3. The level of the build platform 3 may be the level of the build material on the feed platform 3 or may be the level of the build platform 3 itself. Additionally or alternatively, the sensor 19 detects when the feed platform 3 is at its uppermost position and all of the build material has been removed.

Figure 4:
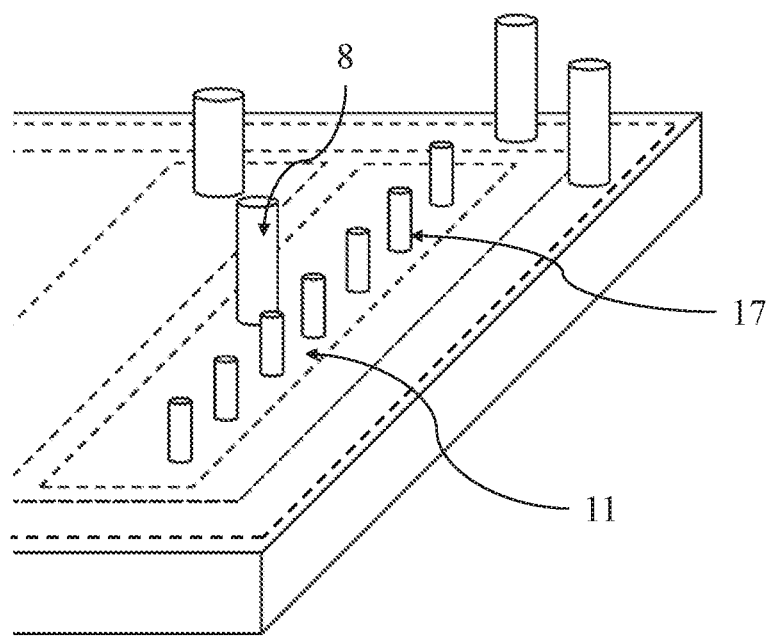
FIG. 4 is a partial isometric schematic view of an apparatus according to one example.

In one example, as shown in FIG. 4, a sealing member 6 comprises a plurality of nozzles 17. In other examples, the nozzles many be a part of a build unit 1. In any case, the nozzles 17 are arranged to inject and/or jet fluid (e.g. air) into the sealed fluid flow path 11. The jet of fluid from the nozzles 17 may agitate and/or dislodge residual build material within the sealed fluid flow path 11. This may create a mist of build material, which can be removed by a fluid flow via the fluid outlet 8. In one form, the fluid inlet 7 comprises the nozzles 17. In another form, the nozzles 17 are provided, for example at strategic positions along a sealed fluid flow path, in addition to the fluid inlet 7. The size and geometry of the nozzles 17 may be modified to provide different fluid flow dynamics. The nozzles 17 may be in fluid communication with the flow generator 12.

In one example, the feed platform 3, overflow 4 and/or peripheral channel 5 may have a cross-section that is free from abrupt corners, for example including rounded corners. This aids in preventing build material accumulating and becoming stuck in any corners.

As shown in FIG. 4, in one example, the plurality of nozzles 17 may be disposed along one side of the sealed fluid flow path 11, opposite to the fluid outlet 8. Alternatively, the plurality of nozzles 17 may be disposed on either side of the fluid outlet 8, or in other locations, depending on the form of the surfaces.

Figure 5:
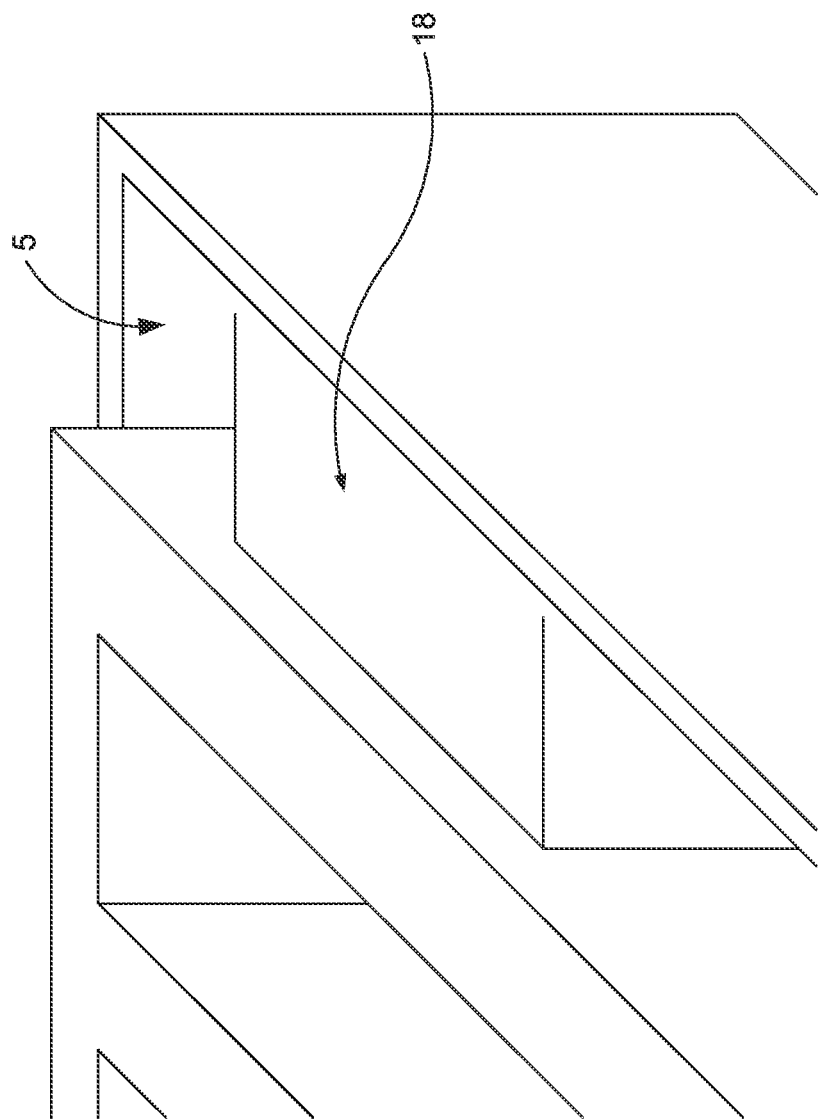
FIG. 5 is a partial isometric schematic view of an apparatus according to one example.

As shown in FIG. 5, a fluid flow restrictor 18 may be provided. The fluid flow restrictor 18 is arranged relative to the sealing member 6 to be disposed in the fluid flow path 11 and restrict flow therein past the fluid flow restrictor. Such a fluid flow restrictor 18 can be deployed to generate a blockage in a sealed fluid flow path. In the example of the peripheral channel 5, for instance, a sealing member 6 overlying the channel creates a continuous, circumferential sealed fluid flow path around the build platform 1. If a fluid inlet 7 and a fluid outlet 8 are provided at points around the channel, two branches are formed between the input 7 and output 8. Fluid may then preferentially travel around one branch more than around the other branch, leading to uneven cleaning. A fluid flow restrictor 18 located in the sealed airflow path breaks the continuity of the channel so that there is a single sealed fluid flow path.

In one example, the fluid inlet 7 is disposed on a first side of the fluid flow restrictor 18 in the sealed fluid flow path 11 and the fluid outlet 8 is disposed on a second side of the fluid flow restrictor 18 in the sealed fluid flow path 11. In this example, fluid flow is between the fluid inlet 7 and the fluid outlet 8 around the sealed fluid flow path 11, from the fluid inlet 7 to the fluid outlet 8, and is prevented from flowing past the fluid flow restrictor 18.

In one example, the fluid flow restrictor 18 is part of the build unit 1. In another example, the fluid flow restrictor 18 is provided as a separate discrete component, which can be introduced into a respective position before a cleaning operation ensues. In yet another example, the fluid flow restrictor 18 forms part of the sealing member 6.

Figure 6:
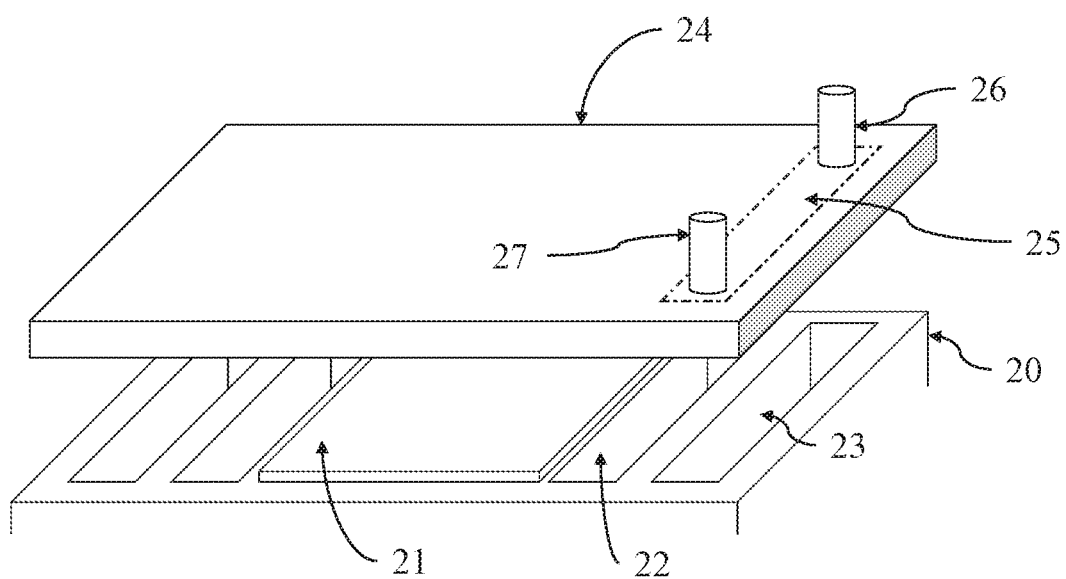
FIG. 6 is an isometric schematic view of an apparatus according to an example.

As shown in FIG. 6, a build unit 20 for a 3D printing system may comprise: a build platform 21, at least one feeding platform 22, at least one overflow channel 23 and a lid 24. The lid 24 to engage with at least one of the at least one feeding platform 22 and the at least one overflow channel 23 and form therewith a sealed fluid flow path 25. The lid 24 comprising a fluid inlet 26 and a fluid outlet 27 to be in fluid communication with the sealed fluid flow path 25.

Figure 7:
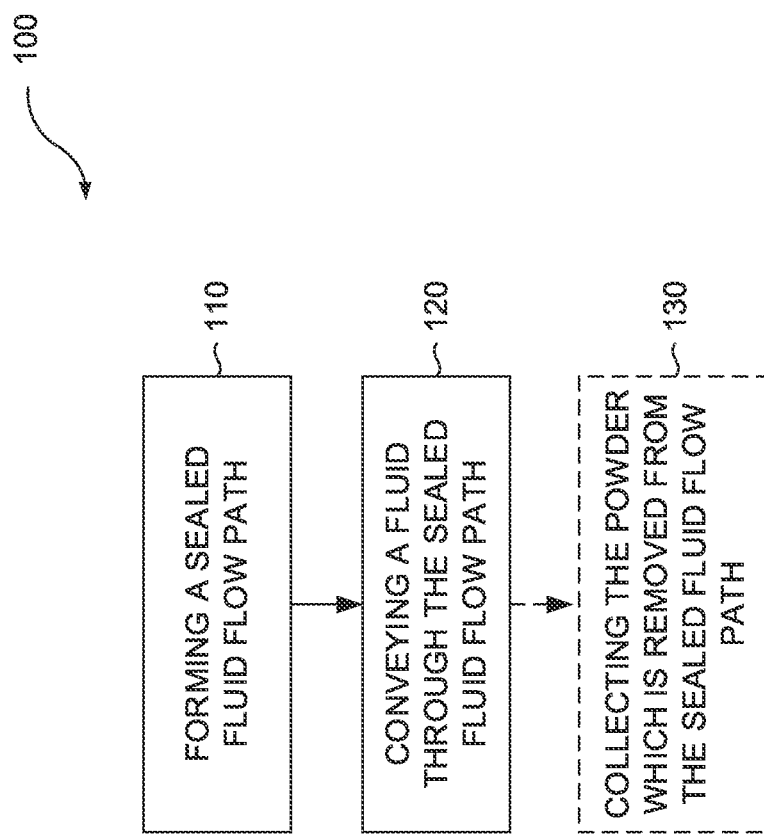
FIG. 7 is a flow diagram of a method according to one example.

FIG. 7 illustrates a method 100 of cleaning a printing system comprising a surface which is exposed to printing material in use. The method 100 comprises forming 110 a sealed fluid flow path 11, comprising the surface within the sealed fluid flow path and extending between a fluid inlet 7 and a fluid outlet 8; and conveying 120 a fluid through the sealed fluid flow path 11 to remove residual build material from the sealed fluid flow path 11.

The method 100 as show in FIG. 7 may be carried out autonomously without any substantial human interaction. For example, the method may be performed in a recycling system.

In one example, the method 100 further comprises collecting 130 the powder which is removed from the sealed fluid flow path 11. The powder may be collected within the build unit 1 or sealing member 5 or may be collected remote from the build unit 1 or the sealing member 5.

In one example, the method 100 comprises jetting fluid into the sealed fluid flow path, for example using nozzles 17, to displace the residual printing material. This may create a mist/cloud of the residual printing material.

Figure 8:
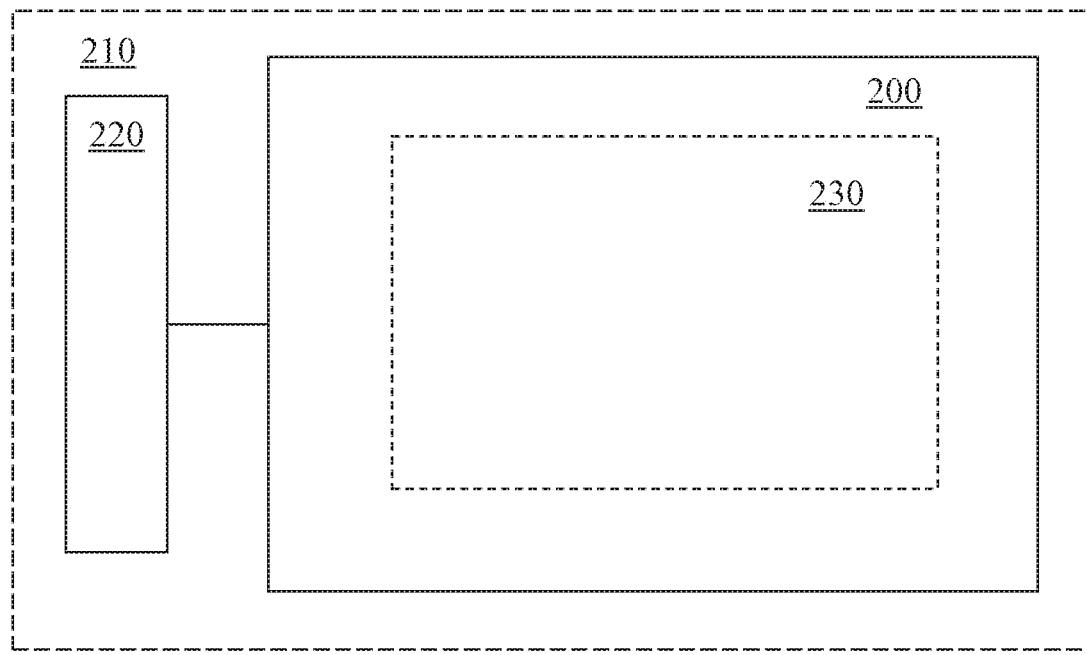
FIG. 8 is a schematic diagram of a non-transitory computer-readable medium according to one example.

FIG. 8 shows a schematic diagram of a non-transitory computer-readable storage medium 200 according to one example. The non-transitory computer-readable storage medium 200 stores instructions 230 that, if executed by a processor 220 of a controller 210, cause the processor 220 to perform one of the methods described herein. The instructions 230 may comprise instructions to perform any of the methods 100 described above with reference to FIG. 7.

It is to noted that the term "or" as used herein is to be interpreted to mean "and/or", unless expressly stated otherwise.

The preceding description has been presented to illustrate and describe examples of the principles described. This description is not intended to be exhaustive or to limit these principles to any precise form disclosed. Many modifications and variations are possible in light of the above teaching. It is to be understood that any feature described in relation to any one example may be used alone, or in combination with other features described, and may also be used in combination with any features of any other of the examples, or any combination of any other of the examples.

What is claimed is:

1. Apparatus, comprising:
   a sealing member for a build unit of a 3D printing system, the build unit comprising a surface which is exposed to residual build material in use, the sealing member adapted to engage with the build unit and form therewith a sealed fluid flow path comprising an inner surface including said surface, a fluid inlet and a fluid outlet, wherein the sealing member operates as a lid that is closed onto the build unit.

2. The apparatus of claim 1, comprising a flow generator to generate a fluid flow in the sealed fluid flow path from the fluid inlet to the fluid outlet thereby to carry residual build material out of the sealed fluid flow path via the fluid outlet.

3. The apparatus of claim 1, comprising at least one compressed air nozzle arranged relative to the sealing member to be disposed in the fluid flow path.

4. The apparatus of claim 1, comprising a support structure pivotally connected to the sealing member, the support structure to support pivotal movement of the sealing member between an open position, in which the build unit is introduced into the support structure in alignment with the scaling member, and a closed position, in which the scaling member engages with the build unit to form the sealed fluid flow path.

5. The apparatus of claim 1, wherein the build unit comprises, around at least a portion of the surface, a peripheral channel to collect build powder that is unused by a build operation, and
   wherein the sealing member is adapted to engage with the peripheral channel and form therewith a sealed fluid flow path extending between the fluid inlet and the fluid outlet.

6. The apparatus of claim 1, wherein the fluid inlet comprises a filter.

7. The apparatus of claim 1, comprising a fluid flow restrictor, wherein the fluid flow path extends around a portion of the build unit and the fluid flow restrictor is arranged relative to the sealing member to be disposed in the fluid flow path and restrict flow therein past the fluid flow restrictor.

8. The apparatus of claim 7, wherein the fluid inlet is disposed on a first side of the fluid flow restrictor in the fluid flow path and the fluid outlet is disposed on a second side of the fluid flow restrictor in the fluid flow path, whereby fluid flow between the fluid inlet and the fluid outlet is around the fluid flow path and not past the fluid flow restrictor.

9. The apparatus of claim 8, wherein the sealing member is adapted to engage with the build unit to form at least two sealed fluid flow paths and the fluid flow restrictor is arranged relative to the sealing member to be disposed in a first of the fluid flow paths.

10. The apparatus of claim 1, wherein the sealed fluid flow path comprises at least one protrusion, which is adapted to create turbulence in an airflow generated between the fluid inlet and the fluid outlet.

11. A method of cleaning a printing system comprising a surface which is exposed to residual printing material in use, the method comprising:

forming a sealed fluid flow path with a sealing member, the sealed fluid flow path comprising the surface within the sealed fluid flow path and extending between a fluid inlet and a fluid outlet; and conveying a fluid through the sealed fluid flow path to remove residual printing material from the sealed fluid flow path.

12. The method of claim 11, comprising jetting fluid into the sealed fluid flow path to displace the residual printing material.

13. The method of claim 11, further comprising collecting the powder which is removed from the sealed fluid flow path.

14. A non-transitory computer-readable storage medium comprising a set of computer-readable instructions stored thereon, which, when executed by a processor, cause the processor to carry out the method of claim 11.

15. A build unit of a 3D printing system comprising:
a build platform;
at least one feeding platform;
at least one overflow channel; and
a lid to engage with at least one of the at least one feeding platform and the at least one overflow channel and form therewith a sealed fluid path, the lid comprising a fluid inlet and a fluid outlet to be in fluid communication with the sealed fluid path.

* * * * *